United States Patent

Kusaka et al.

Patent Number: 5,257,193
Date of Patent: Oct. 26, 1993

[54] METHOD OF AUTOMATICALLY CHANGING THE SPEED STAGE OF A CONSTRUCTION VEHICLE BASED ON VEHICLE LOADING

[75] Inventors: Kohei Kusaka, Tokyo; Kiyoshi Kaneko, Kanagawa; Yoshiaki Kato, Tokyo; Takeo Kato, Kanagawa, all of Japan

[73] Assignee: Kabushiki Kaisha Komatsu Seisakusho, Japan

[21] Appl. No.: 742,282

[22] PCT Filed: Feb. 4, 1988

[86] PCT No.: PCT/JP88/00106

§ 371 Date: Oct. 3, 1988

§ 102(e) Date: Oct. 3, 1988

[87] PCT Pub. No.: WO88/05732

PCT Pub. Date: Aug. 11, 1988

Related U.S. Application Data

[63] Continuation of Ser. No. 279,219, Oct. 3, 1988, abandoned.

[30] Foreign Application Priority Data

| Feb. 4, 1987 | [JP] | Japan | 62-022492 |
| Feb. 16, 1987 | [JP] | Japan | 62-031624 |
| Feb. 16, 1987 | [JP] | Japan | 62-031625 |
| Feb. 16, 1987 | [JP] | Japan | 62-031626 |
| Feb. 16, 1987 | [JP] | Japan | 62-031627 |
| Feb. 19, 1987 | [JP] | Japan | 62-034646 |

[51] Int. Cl.$^5$ .................................................. B60K 41/06
[52] U.S. Cl. ........................... 364/431.07; 364/424.1; 74/866; 123/478
[58] Field of Search ........... 364/424.1, 426.01, 426.04, 364/442, 431.01, 431.07; 74/866; 123/352, 357, 358, 478; 180/306

[56] References Cited

U.S. PATENT DOCUMENTS

| 3,693,479 | 9/1972 | Toyoda et al. | 74/866 X |
| 4,338,666 | 7/1982 | Suzuki et al. | 364/424.1 |
| 4,338,832 | 7/1982 | Pelligrino | 74/866 |
| 4,569,255 | 2/1986 | Holmes | 74/866 |
| 4,622,637 | 11/1986 | Tomita et al. | 364/424.1 |
| 4,643,048 | 2/1987 | Hattori et al. | 364/424.1 |
| 4,704,922 | 11/1987 | Suketomo et al. | 364/424.1 |
| 4,740,898 | 4/1988 | McKee et al. | 364/424.1 |
| 4,845,621 | 7/1989 | Kawata et al. | 364/424.1 |
| 4,853,673 | 8/1989 | Kido et al. | 364/424.1 |

FOREIGN PATENT DOCUMENTS

54-159929 12/1979 Japan .

Primary Examiner—Jack B. Harvey
Assistant Examiner—Edward Pipala
Attorney, Agent, or Firm—Ronald P. Kananen

[57] ABSTRACT

A method for automatically changing the speed of a dump truck for use as a construction vehicle which is capable of improving the fuel cost by utilizing the engine output effectively and efficiently, improving the durability of the power transmission system and giving the driver a comfortable ride. According to this automatic speed change method, a desired, optimum speed stage which meets the loading condition of the dump truck and/or the engine output condition can be selected by using controllers each having a built-in computer.

8 Claims, 15 Drawing Sheets

METHOD OF AUTOMATICALLY CHANGING THE SPEED STAGE OF A CONSTRUCTION VEHICLE BASED ON VEHICLE LOADING

This application is a continuation division, of application Ser. No. 07/279,219 filed Oct. 3, 1988 now abandoned.

TECHNICAL FIELD OF THE INVENTION

This invention relates to a method for automatically changing the speed of a dump truck for use as a construction vehicle to a speed stage to be determined according to the operating condition of a power transmission or speed change gear thereof when the vehicle is running, and also relates to a method for operating the power transmission thereof.

BACKGROUND TECHNIQUE OF THE INVENTION

As for the method of automatically changing the running speed of a vehicle wherein the output side of the engine is connected to a torque converter provided with a lock-up clutch, the output side of the torque converter is connected to the input side of a hydraulically actuated power transmission or speed change gear having a plurality of speed stage clutches. The output side of the power transmission is connected through a differential gear mechanism to the left and right drive wheels. An automatic speed change method has been known wherein speed increasing points and speed decreasing points, i.e., speed change points, are set on the basis of the relationship between the tractive force at each of the speed stages of the power transmission when the engine is developing a maximum speed and the vehicle speed at that time. The vehicle speed is detected from the number of revolutions of the engine and the like. When the thus detected vehicle speed exceeds a speed change point, an automatic speed changeover to a next speed stage can be made.

For example, as shown in FIG. 1, the arrangement is made such that speed change points $f_1$ to $f_6$ are set from the relationship between the tractive forces when the engine is developing a maximum output at forward first to seventh speeds $F_1$ to $F_7$ and the running speeds of the vehicle. When the vehicle speed exceeds each of the speed stages, it is automatically changed over to a next speed stage.

That is to say, the maximum outputs of the engines mounted on dump trucks for use as construction vehicles are not so high as those outputs required for them, and the weight of such vehicles in a loaded condition varies significantly from that in an unloaded condition. Further, because the loadage and the gradient of roads on which vehicles run vary so much, the loading imposed on dump trucks for use as construction vehicles fluctuates largely. Also since it is difficult to detect the cargo on board and the gradient of roads with a high accuracy, it has been a common practice for dump trucks for use as construction vehicles to set speed change points which correspond always to the maximum output condition developed by the engine mounted on each of them, assuming cases where the loading imposed on them is high, and to run them with their engines developing maximum outputs.

In the above-mentioned conventional automatic speed change method, in case the loading on a vehicle is extremely light as, for example, in the case of an unloaded vehicle running on a flatland or in case a loading on the vehicle is comparatively light as in the case of the vehicle in a light load condition running up a slope, the output developed by the engine is not utilized fully thus consuming an extra fuel ineffectively. This is because the output required for a dump truck for use as a construction vehicle in the above-mentioned light load condition is in fact less than the maximum output developed by the engine. Further, in mining slopes and so forth, a plurality of dump trucks for use as construction vehicles having different engine outputs usually run along the same course. So, it is not allowed for only one truck to run at a higher speed than the others, at a maximum output developed by its engine. Rather, the truck must be driven at a lower speed which is adjusted to the lower speeds of other vehicles. Therefore, vehicles with higher engine outputs are required to run at a lower speed stage; that is, at a higher number of revolutions of the engine, thereof, resulting in increases in the fuel consumption rate.

Whilst, as to the engine, output, there are cases where even when a vehicle is driven at a speed stage higher than the current running speed, the same tractive force can be obtained. In FIG. 1, if a vehicle subjected to a load, for example, at point "a" is running at a speed of $V_1$, then the vehicle speed is set at the forward fifth speed $F_5$, whilst from the viewpoint of the tractive force (engine output), it becomes possible for the vehicle to run at the speed stage for the forward sixth speed $F_6$.

Whilst, in case a dump truck for use as a construction vehicle which is running on a flatland at a high speed stage runs up a slope, for example, or in case the running condition of the vehicle is changed over to an idling condition by reducing the degree of opening of the accelerator to zero, it is required for the vehicle to make a number of speed changes in turn from high speed stages to low speed changes in a short time. If such speed changes are made a plurality of times in a short time, then excessive forces tend to be exerted on the power transmission system from the transmission or speed change gear to the drive wheels thus impairing the durability of the power transmission system and causing shocks each time a speed change is made and also causing plural changes in the vehicle speed thereby giving the driver rough ride.

Further, as for the conventional speed change operation for the above-mentioned dump trucks for use as construction vehicles, there has been known a speed change operational method wherein a speed change is made in a condition that the lock-up clutch is disconnected and the output side of the engine is connected through a torque converter to the input side of the power transmission or speed change gear and, after the completion of the speed change, the lock-up clutch is connected again so that the output side of the engine may be connected directly to the input side of the power transmission.

In such a speed change operational method, when the vehicle is in a normal running condition, the engine output can be directly transmitted to the power transmission not through the intermediary of the torque converter thus reducing the power losses. Each time a speed change is made, the engine output is input or transmitted through the torque converter to the power transmission so that even if the revolving speed of the input shaft of the power transmission does not correspond to that of the output shaft, the shocks due to speed changes can be absorbed by the torque converter to some degree thereby reducing the magnitude of such shocks.

However, if after the completion of a speed change and when connecting or engaging the lock-up clutch, the number of revolutions of the engine does not correspond to that of the input shaft of the speed change gear, then a shock due to a speed change will occur.

When, for example, a speed change to a speed stage lower than the present speed stage, i.e., a shift-down operation is made, the load imposed on the engine will increase, thus causing a reduction in the number of revolutions of the engine so that when the lock-up clutch is connected the number of revolutions of the engine becomes lower than that of the input shaft of the power transmission or speed change gear thereby causing a shock due to the speed change.

Further, as for the conventional speed change operation, there has been known a speed change operational method wherein the supply of the pressurized fluid discharged by a pressurized fluid source to each of a plurality of speed stage clutches is controlled by each of the speed change valves associated therewith, and a progressive pressure increasing valve for gradually raising the fluid pressure in the pressurized fluid supply source is provided so that, when supplying the fluid under pressure to a predetermined speed stage clutch, the fluid pressure can be increased progressively to ensure smooth connection or engagement of the speed stage clutch without causing any shocks due to a speed change.

Each of the speed stage clutches comprises a plurality of clutch plates which are rendered operative when they are urged into contact with one another and which are rendered inoperative when they are separated from one another. If the time required until the fluid pressure is increased to a predetermined value becomes longer, then each of the speed stage clutches can be engaged more smoothly. However, on the other hand, a longer time is required to make a speed change. Whilst, if the fluid pressure is increased to a predetermined value in a short time, then the time required for the speed change can be reduced, but on the other hand the speed stage clutch is engaged quickly thus causing a big shock due to the speed change. For this reason, the time required for increasing the fluid pressure to a predetermined value is usually set at one intermediate value of the two; that is to say, progressive pressure increasing characteristics are set by means of a progressive pressure increasing value.

Whilst the loading imposed on the dump trucks for use as construction vehicles varies remarkably between loaded and unloaded conditions, and so they are driven repeatedly in heavy and light load conditions. When the vehicle is running in a heavy load condition, a high load is applied to the power transmission so that the torque transmitted thereby becomes high, whilst when running in a light load condition, a low load is applied to the transmission so that the torque transmitted thereby becomes low.

If the torque transmitted to the power transmission is high, the clutch plates tend to slip, while, if the torque is low the tendency to causing slipping of the clutch plates is reduced. Therefore, if as mentioned above, the time required for increasing the fluid pressure to a predetermined value is constant and if the torque transmitted to the power transmission is high, the time required until the clutch plates are engaged completely without causing any slip to ensure satisfactory power transmission tends to increase thus increasing the time required for making a speed change. Whilst, in case the torque transmitted to the power transmission is low, it becomes possible to attain a condition that satisfactory power transmission can be made in a short time thereby increasing the tendency of occurrence of big shocks due to a speed change.

SUMMARY OF THE INVENTION

The present invention has been contemplated in view of the above-mentioned circumstances, and has for its first object to provide a method for automatically changing the speed of a dump truck for use as a construction vehicle wherein the engine output can be utilized effectively and efficiently thereby reducing the fuel consumption.

A second object of the present invention is to provide a method for automatically changing the speed of a dump truck for use as a construction vehicle wherein, when it is required to make a quick speed change from a high speed stage to a low speed stage, a smooth speed change to an optimum speed stage can be achieved in a short time.

A third object of the present invention is to provide a speed change operational method for a transmission or speed change gear provided with a torque converter having a lock-up clutch which does not cause any shocks due to a speed change when making a gear-shift down.

A fourth object of the present invention is to provide a speed change operational method for a hydraulically actuated power transmission, which enables the time required for a speed change in a heavy load condition to be shortened and also the shocks due to a speed change in a light load condition to be reduced.

To achieve the above-mentioned objects, according to a first aspect of the present invention, there is provided a method for automatically changing the speed of a dump truck for use as a construction vehicle wherein the output side of the engine is connected to a torque converter provided with a lock-up clutch, the output side of the torque converter is connected to the input side of a hydraulically actuated power transmission or speed change gear having a plurality of speed stage clutches, and the output side of the power transmission is connected through a differential gear mechanism to the left and right drive wheels, the arrangement being made such that a desired optimum speed stage which corresponds to the load condition of the dump truck and/or the output condition of the engine thereof can be automatically selected by means of a controller with a built-in computer.

Further, according to a second aspect of the present invention, there is provided a method for automatically changing the speed of a dump truck for use as a construction vehicle, characterized in that when the vehicle is running in a heavy load condition, an automatic speed change is made by setting the speed change point at each speed stage at a speed corresponding to the maximum output condition of the engine, whilst when the vehicle is running in a light load condition the engine is put in a partial output developing condition to allow the dump truck to run at a fixed, constant speed, at that time, if the engine output is sufficient or has an allowance to such a degree as not to cause at least any hunting, the number of revolutions of the engine and the torque developed by the engine when the vehicle is running at the constant speed are input to the controller so as to compute the then-developed engine output or horsepower and then compute the number of revolutions of the engine and the engine torque at the point of intersection of a equi-horsepower curve on the horsepower computed by the computation with a torque curve in the engine maximum output condition, and the product of either one of the computed number of revolutions of the engine or the computed engine torque and the speed reduction ratio at a corresponding speed stage is compared with the product of either one of the input number of revolutions of the engine or the input engine torque and the speed reduction ratio at a speed stage when the input is made, and as a result of comparison, if the former product is larger than the latter product, a shift-up signal is transmitted or output to the controller so that a speed stage higher than that to be selected by the automatic speed change in the heavy load condition can be automatically selected.

Further, according to a third aspect of the present invention, there is provided a method for automatically changing the speed of a dump truck for use as a construction vehicle, characterized in that a rack rod attached to a governor for controlling the amount of fuel injection is controlling the amount of fuel injection and is controlled by operating a running mode changeover switch provided in the running control circuit of the dump truck so as to change-over the maximum output of the engine to a higher or lower level and set it at that level, and when the vehicle is running in a heavy load condition the maximum output of the engine is set at a higher level by operating the running mode changeover switch and the speed change point at each speed stage is set at a speed corresponding to the higher level of the engine maximum output to thereby conduct an automatic speed change, whilst when the vehicle is running in a light load condition the maximum output of the engine is set at a lower level by operating the running mode changeover switch and the speed change point at each speed stage is set at a speed which is lower than the speed change point in the heavy load condition and which corresponds to the lower level of the engine maximum output to thereby conduct an automatic speed change.

Still further, according to a fourth aspect of the present invention, there is provided a method for automatically changing the speed of a dump truck for use as a construction vehicle, characterized in that, when the speed of the dump truck drops in a short time from a high speed running condition at a high speed stage, a signal indicative of the degree of opening of the accelerator and a signal indicative of the revolving speed of the input shaft of the power transmission as well as a signal indicative of the present speed stage are transmitted or input to the controller so that the revolving speed of the input shaft of the power transmission when the vehicle is running at a high speed may be compared with the present revolving speed of the input shaft so as to compute the deceleration of the vehicle which occurs at that time and select a preset speed stage according to the value of the deceleration, and when the speed of the dump truck has reached a value corresponding to the selected speed stage, a signal indicative of the selected speed stage is transmitted as an output signal to the controller so that a speed changeover straight to a speed stage which is optimum for the then dropped vehicle speed can be made at a time.

Accordingly a fifth aspect of the present invention is to provide a method for automatically changing the speed of a dump truck for use as a construction vehicle, characterized in that when the vehicle is in a normal running condition, the lock-up clutch is connected so that the engine output can be transmitted directly to the power transmission, whilst when a shiftdown signal is input to said controller, the lock-up clutch is disconnected so that the engine output may be transmitted through the torque converter to the transmission so as to make a shift-down operation, and after the completion of the shift-down operation the lock-up clutch is connected again in a condition that the number of revolutions of the engine is increased only for a predetermined period of time.

Further, according to a sixth aspect of the present invention, there is provided a method for automatically changing the speed of a dump truck for use as a construction vehicle, characterized in that when the vehicle is running in a heavy load condition the fluid pressure in a selected speed stage clutch is increased to a predetermined value in a short time so that the selected speed clutch can be connected in a short time, whilst when the vehicle is running in a light load condition the fluid pressure in a selected speed stage clutch is increased to a predetermined value in a comparatively long time so that the selected speed clutch may be connected comparatively slowly without causing any shocks due to a speed change.

The above and many other advantages, features and additional objects of the present invention will become apparent to those versed in the art upon making reference to the following detailed description and accompanying drawings in which preferred structural embodiments incorporating the principles of the present invention are shown by way of illustrative example only.

DETAILED DESCRIPTION OF PREFERRED EMBODIMENTS

The method for automatically changing the speed of a dump truck for use as a construction vehicle according to the present invention will now be described in detail below with reference to the accompanying drawings.

A dump truck for use as a construction vehicle has a vessel for loading earth and sand or rocks and so forth, which is mounted on the vehicle body thereof so as to be tilted freely. Left and right steering wheels and left and right drive wheels are mounted through suspension cylinders on the vehicle body.

Figure 2:
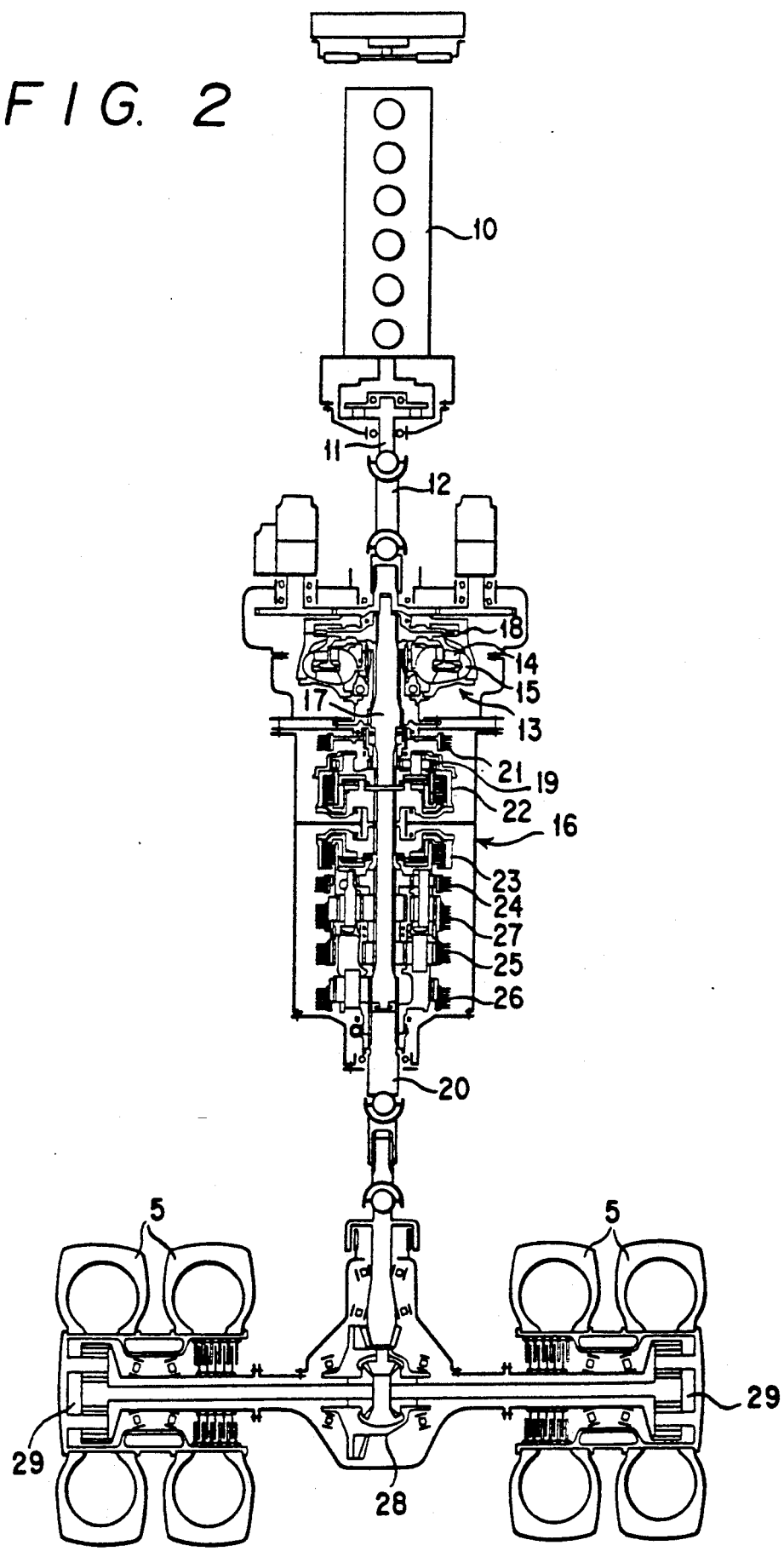
FIG. 2 is a schematic, developed explanatory view of a power transmission system of a dump truck for use as a construction vehicle.

In the power transmission system of a dump truck for use as a construction vehicle as shown in FIG. 2, the above-mentioned drive wheels are denoted by reference numerals 5,5. These drive wheels 5,5 are connected through the power transmission arrangement as shown in the drawing to an engine 10.

Stating in brief, in FIG. 2, the engine 10 has an output shaft 11 which is connected through a drive shaft 12 to a pump 14 for use with a torque converter 13, and a turbine 15 of the pump 14 is connected to an input shaft 17 of a power transmission or speed change gear 16. Further, there is provided a lock-up clutch 18 for connecting the turbine 15 of the pump 14. The power transmission 16 connects the input shaft 17 through a plurality of planetary gear mechanisms 19 to an output shaft 20 and is adapted to turn on and off a high speed clutch 21, a low speed clutch 22, first to fourth speed clutches 23 to 26, and a reversing clutch 27 so that a speed change can be made to either one of the forward first to seventh speeds and a reversing speed, respectively.

The output speed 20 of the power transmission or speed change gear 16 is connected through a differential gear 28 and final reduction gears 29 to the drive wheels 5,5.

Figure 3:
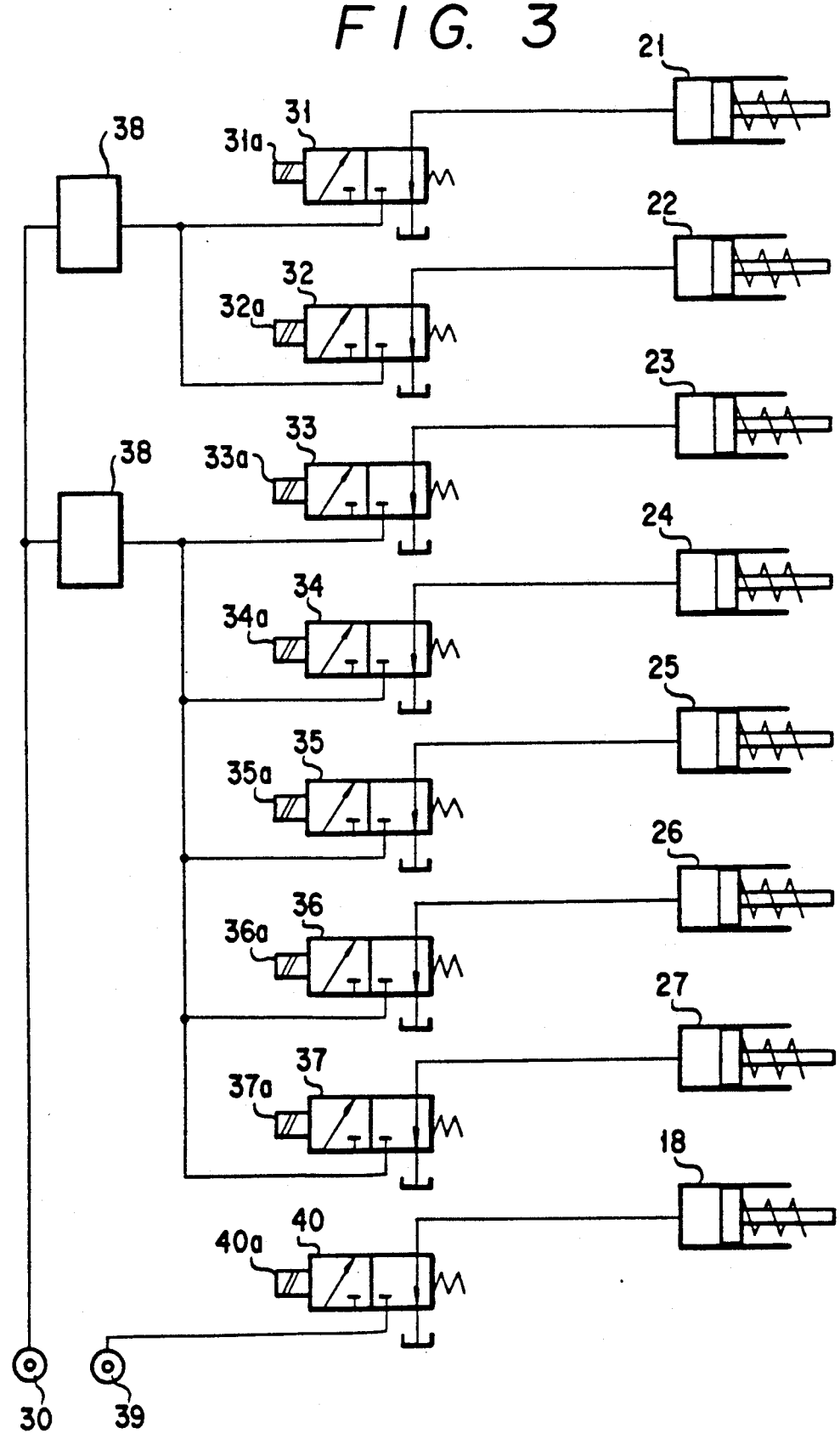
FIG. 3 is a view showing a hydraulic circuit for effecting speed changes which is used in the power transmission system shown in FIG. 2.

As shown in FIG. 3, the above-mentioned clutches 21 to 27 are controlled, respectively, so as to be turned on and off by controlling the supply of fluid under pressure through the first to seventh speed change valves 31 to 37, respectively. The first to seventh speed change valves 31 to 37 are adapted to be changed over to their fluid supply positions when their solenoids 31a to 37a are energized and to assume their fluid supply cut-off positions when the solenoids are deenergized. The input sides of the first and second speed change valves 31, 32 are provided with a modulation valve (inching valve) 38, and also the input sides of the third to seventh speed change valves 33 to 37 are provided with another modulation valve (inching valve) 38 so that the pressure of the fluid under pressure supplied into each of the clutches 21 to 27 may be raised smoothly. The above-mentioned lock-up clutch 18 is supplied with the fluid under pressure discharged by a pump 39 through a lock-up changeover or control valve 40. The lock-up changeover valve 40 is adapted to be changed over to a fluid supply position when its solenoid 40a is energized so as to render the lock-up clutch 18 on or operative thus connecting the pump 14 and the turbine 15, and to assume a fluid supply cut-off position when the solenoid 40a is deenergized thereby rendering the lock-up clutch 18 off or inoperative.

Figure 4:
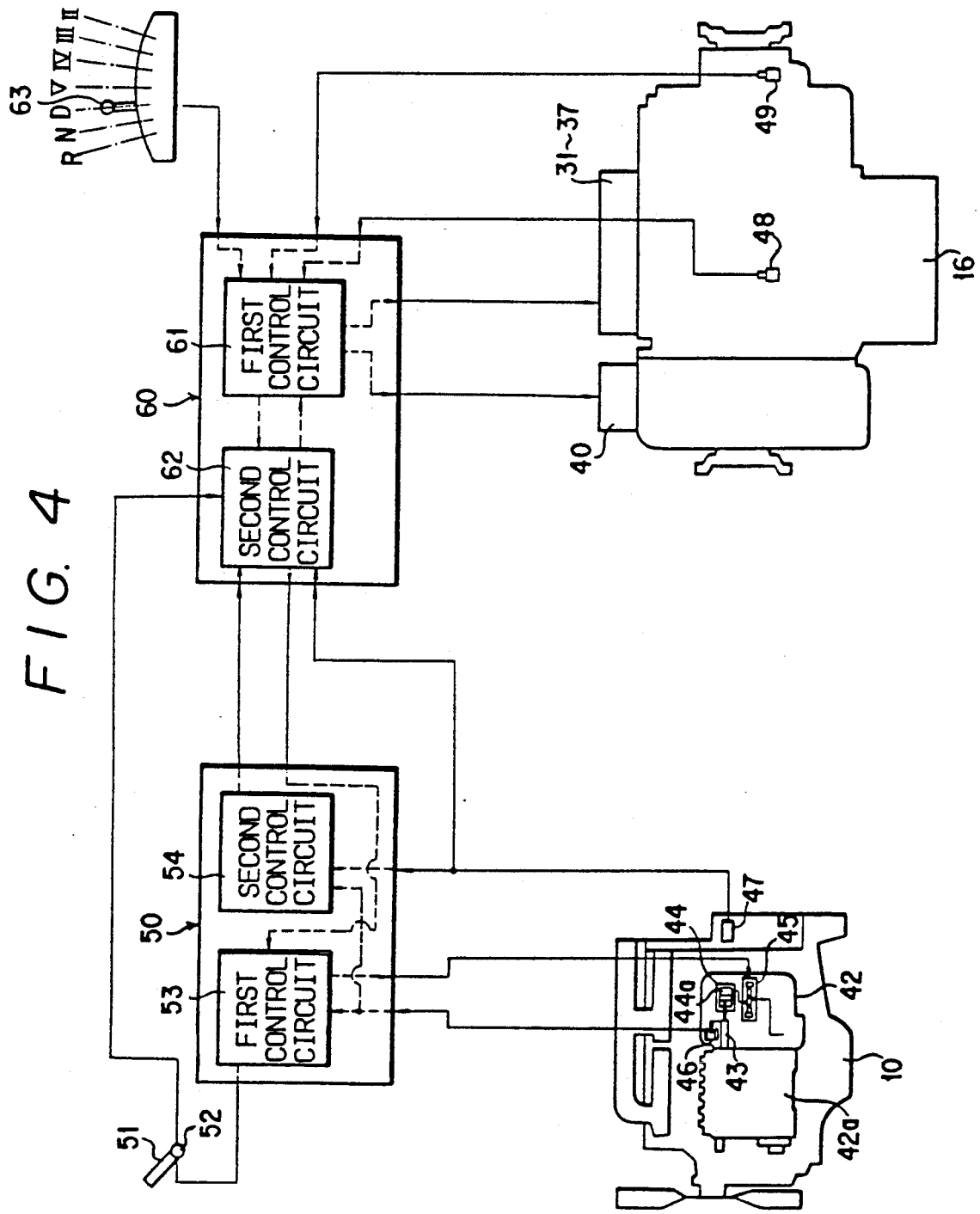
FIG. 4 is a schematic, overall explanatory view of a system for carrying out one embodiment of the automatic speed change method according to the present invention.

FIG. 4 is a schematic, overall explanatory view of a system for carrying out one embodiment of the automatic speed change method according to the present invention.

In FIG. 4, the engine 10 is provided with a fuel injection pump 42a whose amount of fuel injection is controlled by an electronic control governor 42. The electronic control governor 42 is adapted to control the amount of fuel to be injected into the engine by reciprocating a rack rod 43 by the action of a hydraulic cylinder 44. The hydraulic cylinder 44 has a chamber 44a which is supplied through a control valve 45 with the fluid under pressure discharged by a pressurized fluid supply source, not shown. There is provided a rack position detecting sensor 46 which comprises a differential transformer. Further, there is provided an engine revolution detecting sensor 47 adapted to detect the number of revolutions of the output shaft 11 of the engine 10. And, the power transmission 16 is provided with an input shaft revolving speed detecting sensor 48 and an output shaft revolving speed detecting sensor 49 which are adapted to detect the revolving speeds of the input shaft 17 and the output shaft 20, respectively.

Reference numeral 50 denotes an engine controller which comprises a first control circuit 53 and a second control circuit 54 for conducting operational controls in such a manner that when the controller 50 supplied or input with a signal indicative of the degree of opening of the accelerator transmitted by an accelerator sensor 52 adapted to detect the amount of depression of an accelerator pedal 51 (the degree of opening of the accelerator), it may transmit a control signal as an output signal to the control valve 45 so as to control the supply of the fluid under pressure discharged by the pressurized fluid supply source into the chamber 44a of the hydraulic cylinder 44 to thereby reciprocate the rack rod 43 so that the position of the rack detected by the rack position detecting sensor 46 may become a rack position corresponding to the signal indicative of the degree of opening of the accelerator. The second control circuit 54 is adapted to compute the engine output condition and the engine torque according to the number of revolutions of the engine transmitted by the engine revolution detecting sensor 47 and the position of the rack transmitted by the rack position detecting sensor 46.

Stating in brief, the engine output characteristic curves (A, $B_1$, $B_2$, $B_3$... in FIG. 5) or the engine output condition can be seen from the position of the rack, whilst the positions on the engine output torque curves (each of Points $P_1$, $P_2$, $P_3$... in FIG. 5) or the torque can be seen from the number of revolutions of the engine.

Reference numeral 60 denotes a controller for the power transmission or speed change gear which comprises a first control circuit 61 and a second control circuit 62 for conducting operational controls in such a manner that it may compute the vehicle speed on the basis of either the input shaft revolving speed from the input shaft revolving speed detecting sensor 48 provided in the power transmission 16 or the output shaft revolving speed from the output shaft revolving speed detecting sensor 49 and, when the vehicle speed is more than a preset speed change point, it may transmit or output a control signal to the above-mentioned first to seventh speed change valves 31 to 37 and the lock-up change-over or control valve 40 so as to disconnect the lock-up changeover valve 18 and connect the engine 10 with the power transmission 16 through the torque converter 13 and then change the present speed stage over to a higher speed stage or a lower speed stage and, after the completion of the speed change, connect the lock-up clutch 18 again to thereby directly connect the engine 10 with the power transmission 16.

Further, the first control circuit 61 is supplied or input with gear shift position signals R, N, D, V, IV, III and II from the gear shift lever 63 so that when the signal R is input a speed change to the reversing speed is made; when the signal N is input a speed change to the neutral is made; and when any one of the signals D, V, IV, III and II is input an automatic speed change between the predetermined speed stages is made.

The above-mentioned second control circuit 62 is adapted to discriminate if it is possible to make a speed change from the present speed stage to a higher speed on the basis of the engine output condition and the torque transmitted by the control circuit 54 in the engine controller 50 and a speed stage signal transmitted by the first control circuit 61, and when it is proved that the present speed stage can be changed to a higher speed, transmit an output signal to the first to seventh speed change valves 31 to 37 and the lock-up change-over valve 40 so as to make a speed change to a higher speed stage and, at the same time, transmit a fuel injection control signal for controlling the engine at an equi-horse power as an output signal to the first control circuit 53 in the engine controller 50.

Stating in brief, the second control circuit 62 serves as a microcomputer which is adapted to compute the engine output or horsepower on the basis of the engine output condition and the torque which are input to it (For example, the partial output condition curve "B" and the point "$P_1$" along the curve) and also compute the number of revolutions $N_1$ of the engine from the point of intersection (X in FIG. 5) of an equi-horsepower curve (curve "e" in FIG. 5) with an engine characteristic curve in a condition that the engine is developing its maximum output (curve "A" in FIG. 5) and, when the product of the number of revolutions $N_1$ of the engine and the speed reduction ratio at a higher speed stage when a speed change to the high speed stage is made is larger than the product of the thus input number of revolutions $N_2$ of the engine and the speed reduction ratio at the present speed stage, discriminate that a speed change to a higher speed stage can be made and generate a shift-up signal as an output signal.

Moreover, the second control circuit 62 will compute, in fact, a slightly lower number of revolutions of engine in order to provide an allowance to the thus actually computed number of revolutions of the engine.

Figure 1:
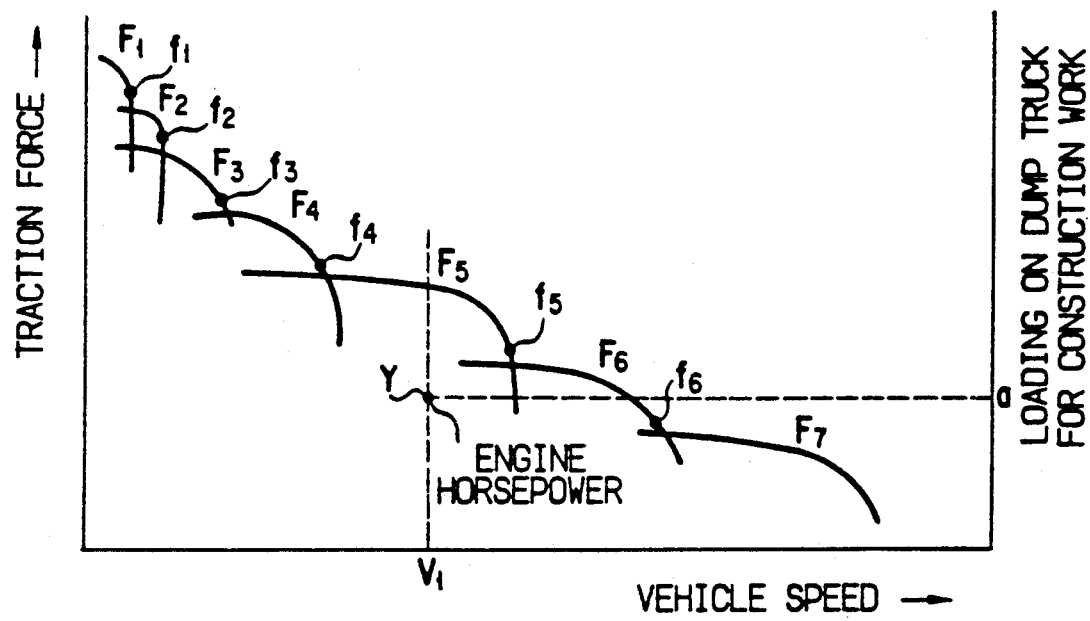
FIG. 1 is an explanatory view of an example of a speed change pattern for an automatic speed change of a dump truck for use as a construction vehicle.
Figure 5:
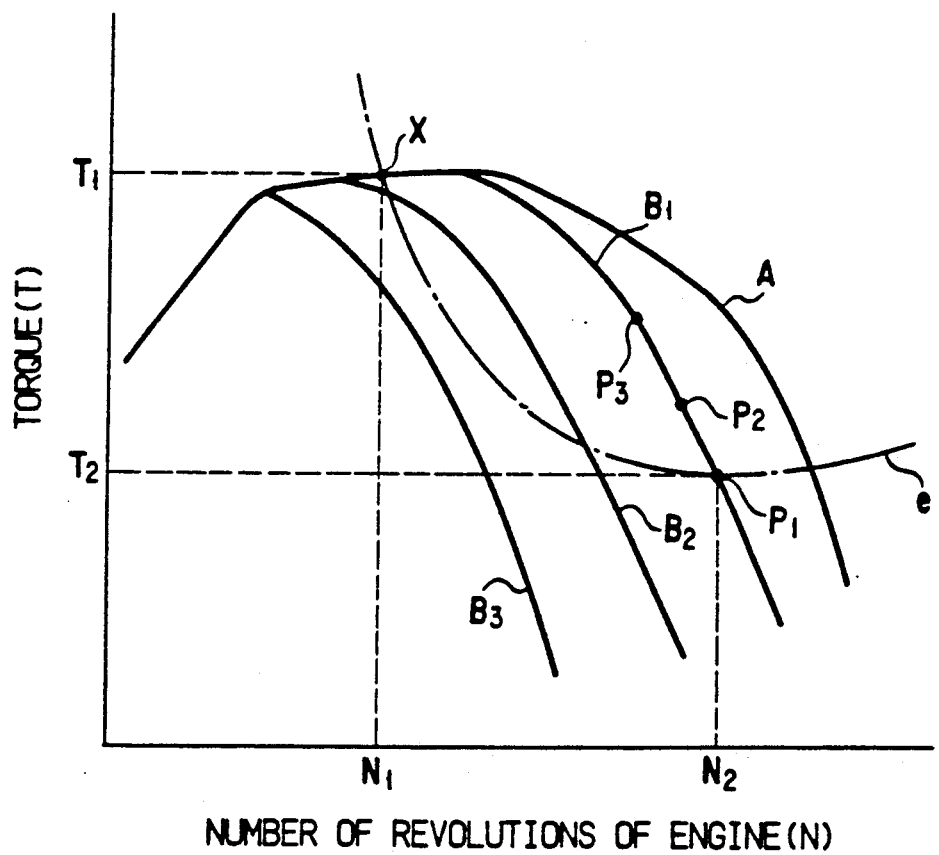
FIG. 5 is a diagram showing an example of the engine output characteristics developed by the dump truck for use as a construction vehicle.

Stating more concretely, when the engine 10 is in a partial output developing condition with the accelerator 51 kept in a semi-opened state, which is shown, for example, by a curve "$B_1$" in FIG. 5, and the load on a dump truck for use as a construction vehicle is small as shown by "a" in FIG. 1; that is, the vehicle is in an unloaded condition, and if the vehicle is driven at a constant speed which is, for example, a speed $V_1$ shown in FIG. 1, then the vehicle speed is automatically changed over to a speed stage corresponding to the vehicle speed $V_1$ such as, for example, the forward fifth speed $F_5$, by the action of the first control circuit 61 in the power transmission controller 60 in the same manner as that of the conventional system.

As a result, the second control circuit 62 is supplied or input with a signal indicative of the forward fifth speed $F_5$ as well as the engine output condition and the engine torque available at that time so as to compute the engine horsepower, and discriminate the present position Y from the engine horsepower (load) and the vehicle speed as shown in FIG. 1, and also discriminate that the vehicle is running at a fixed, constant speed from the fact that the signal indicative of the degree of opening of the accelerator remains unchanged and compute the number of revolutions $N_1$ of the engine at a point of intersection "X" of the equi-horsepower curve "e" passing a point $P_1$ in FIG. 5 and the characteristic curve "A" of the engine when it is developing its maximum output.

Then, this number of revolutions $N_1$ of the engine is multiplied by the speed reduction ratio at the forward sixth speed $F_6$, and when the product obtained thereby is larger than the product of the speed reduction ratio at the forward fifth speed $F_5$ to which an automatic speed change is made and the number of revolutions $N_2$ of the engine obtained at that time, the second control circuit 62 will transmit a shift-up signal as an output signal to the first control circuit 61 so as to make an automatic speed change to the forward sixth speed $F_6$ in the same manner as that of the ordinary automatic speed change operation.

Simultaneously with the above-mentioned automatic speed change operation, the second control circuit 62 will transmit a signal indicative of "the engine should be controlled at an equi-horse power" to the first control circuit 53 in the engine controller 50 so as to control the amount of the fuel to be injected into the engine.

In case a sufficient engine output is available as mentioned above, the vehicle can be driven at a constant speed after an automatic speed change to a speed stage higher than that selected by the ordinary automatic speed change has been made so that the number of revolution of the engine can be decreased so as to reduce the fuel consumption rate and the horsepower loss thereby achieving a significant saving in the fuel consumption.

Whilst, in the above-mentioned embodiment, the control of the engine output condition and the engine torque is made by means of the second control circuit 54 in the engine controller 50, it may be made by means of second control circuit 62 in the power transmission controller 60. The first control circuit 61 and the second control circuit 62 may be used as one microcomputer unit in order to make the ordinary automatic speed change, and a shift-up operation when the vehicle is running at a constant speed.

Further, although in the above-mentioned embodiment the arrangement is made such that a shift-up signal is transmitted according to the relationship between the number of revolutions of the engine and the speed reduction ratio, it is also possible to transmit a shift-up signal as an output signal according to the relationship between the engine torque and the speed reduction ratio.

Stating in brief, the arrangement is made such that in case of $T_1 \times G_{N+1} \geq T_2 \times G_{N(1+a)}$ a shift-up signal is transmitted.

In the above formula, reference character $T_1$ denotes the torque at the number of revolutions $N_1$ of the engine, $T_2$ the torque at the number of revolutions $N_2$ of the engine, $G_N$ the speed reduction ratio at each of speed stages, and $a$ an allowance factor for torque.

Further, it may be effected to predetermine the zone where a shift-up is to be made on the basis of the engine output characteristic curve by computing it previously and to conduct a shift-up operation in case the vehicle speed is within such a range. By so doing, the need for conducting the above-mentioned complicated computation can be eliminated.

Figure 6:
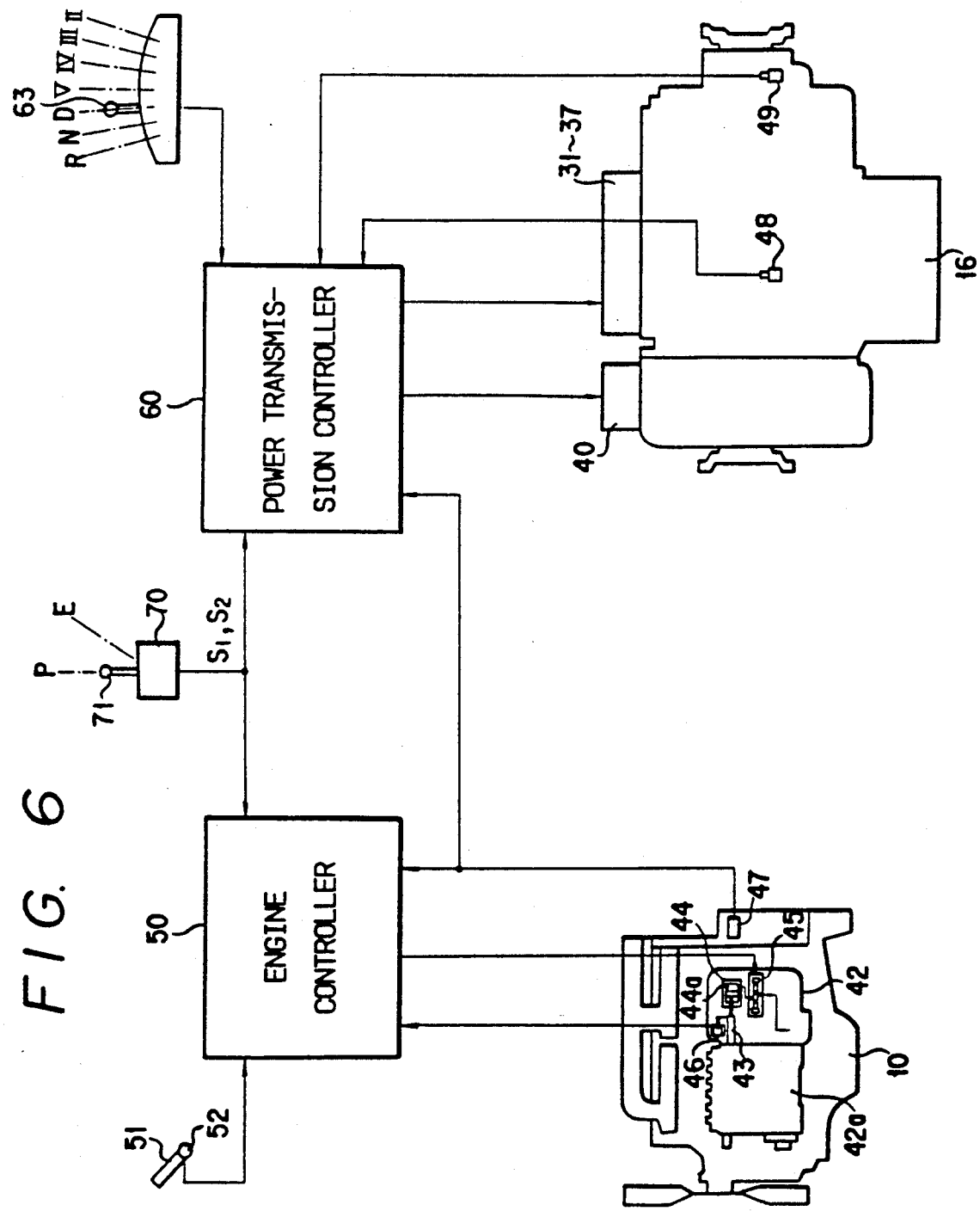
FIG. 6 is a schematic, overall explanatory view of a system for carrying out another embodiment of the automatic speed change method according to the present invention.

In FIG. 6 there is shown a schematic configuration of the system whereby a second embodiment of the automatic speed change according to the present invention may be carried out.

In FIG. 6, component parts indicated by the same reference numerals and characters used in the configuration shown in FIG. 4 have the same functions, and so the detailed description thereof is omitted herein to avoid duplication in explanation.

The system shown in FIG. 6 differs from that shown in FIG. 4 in that, as is obvious from FIG. 6, it further comprises a running mode changeover switch 70 and its manipulating lever 71 provided in the vehicle running control circuit. The arrangement is made such that, when the manipulating lever 71 for changeover of the running mode is switched over to a heavy loading position P and a light loading position E, respectively, a heavy load signal $S_1$ and a light load signal $S_2$ are input to the engine controller 50 and the power transmission controller 60, respectively, and when the heavy load signal $S_1$ is input to the engine controller 50 and the power transmission controller 60, the maximum output of the engine is set at a high level as shown by a curve "$A_1$" in FIG. 7 and a shift-up point (the number of revolutions $N_1$ of the engine=2,230 rpm) and a shift-down point (the number of revolutions $N_2$ of the engine=1,400 rpm) are set so that a heavy load running mode suitable for running the vehicle at a heavy load can be obtained.

Figure 7:
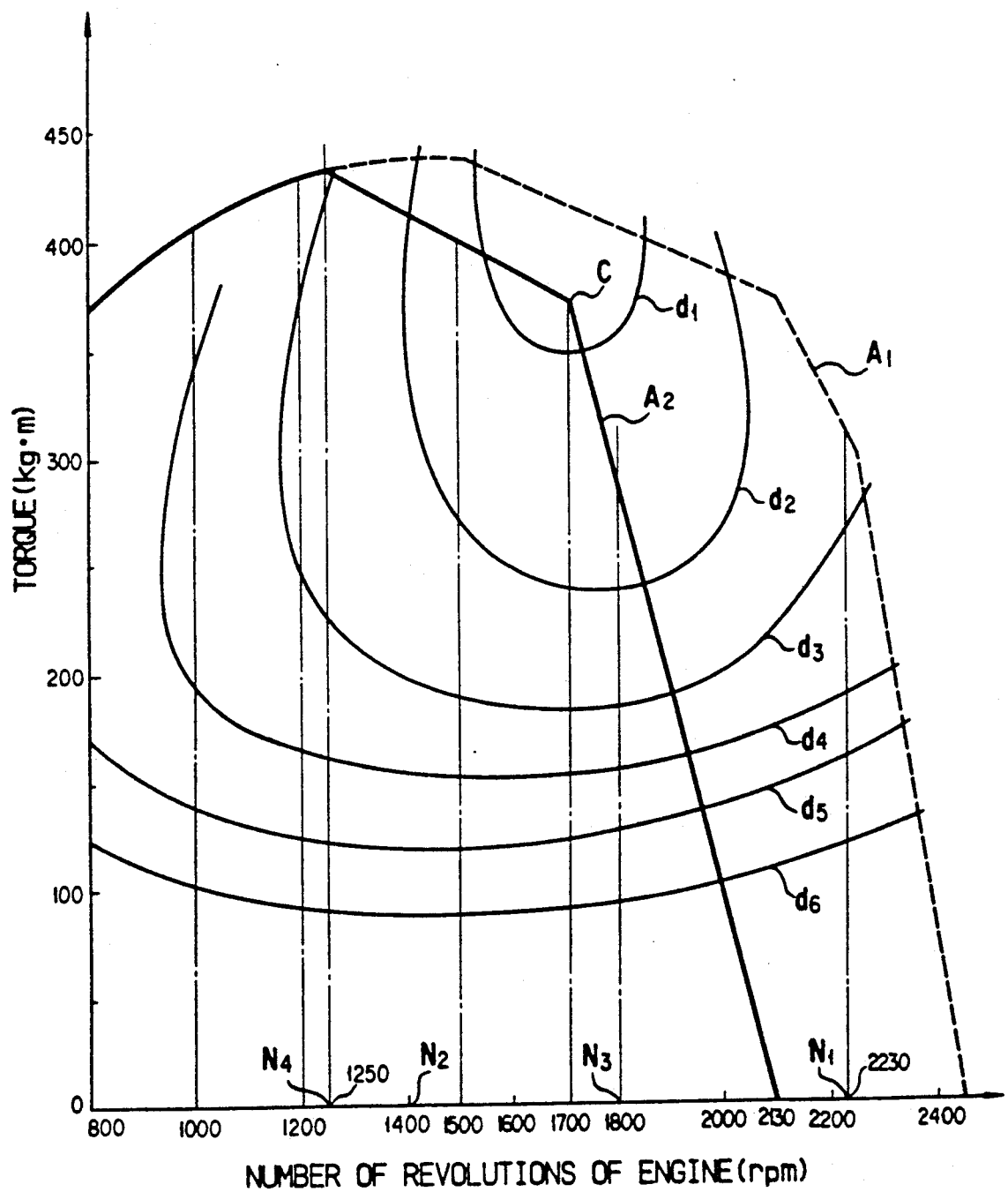
FIG. 7 is a diagram showing, in combination, the engine output characteristic curves and equi-fuel cost curves obtained by the automatic speed change method which is carried out in the system as shown in FIG. 6.

Further, when the light load signal $S_2$ is input to the engine controller 50, the stroke of the rack rod 43 corresponding to a signal indicative of the degree of opening of the accelerator to set the maximum output of the engine at a lower level as shown by a curve "$A_2$" in FIG. 7, and the rated output of the engine is set at a level as shown by "C" which is inside a high equi-full cost curve $d_1$ so that the number of revolutions of the engine can be set at, for example, 1,700 rpm. Further, reference characters $d_2$ to $d_6$ indicate equi-fuel cost curves, respectively.

Still further, when the light load signal $S_2$ is input to the power transmission controller 60, the speed change point is changed to a lower speed side and the shift-up point is set at, for example, the number of revolutions $N_3$ (1,800 rpm) of the engine and the shiftdown point is set at, for example, the number of revolutions $N_4$ (1,250 rpm) of the engine in FIG. 7.

As a result, a light load running mode suitable for running the vehicle at a light load can be obtained.

Figure 8:
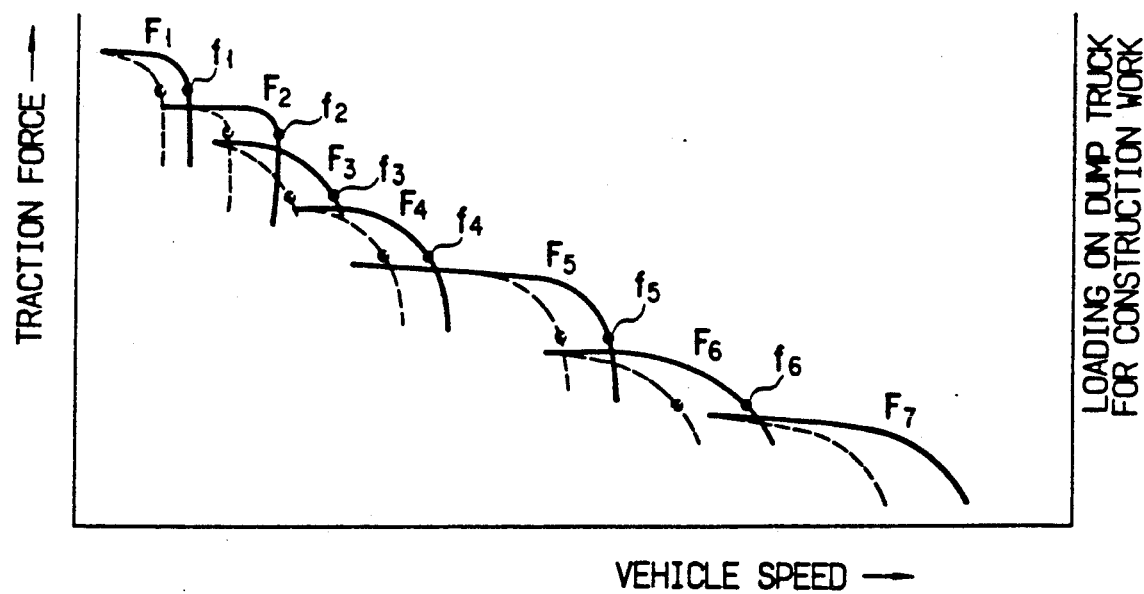
FIG. 8 is an explanatory view of the speed change pattern achieved by the automatic speed change method which is carried out in the system as shown in FIG. 6.
Figure 16:
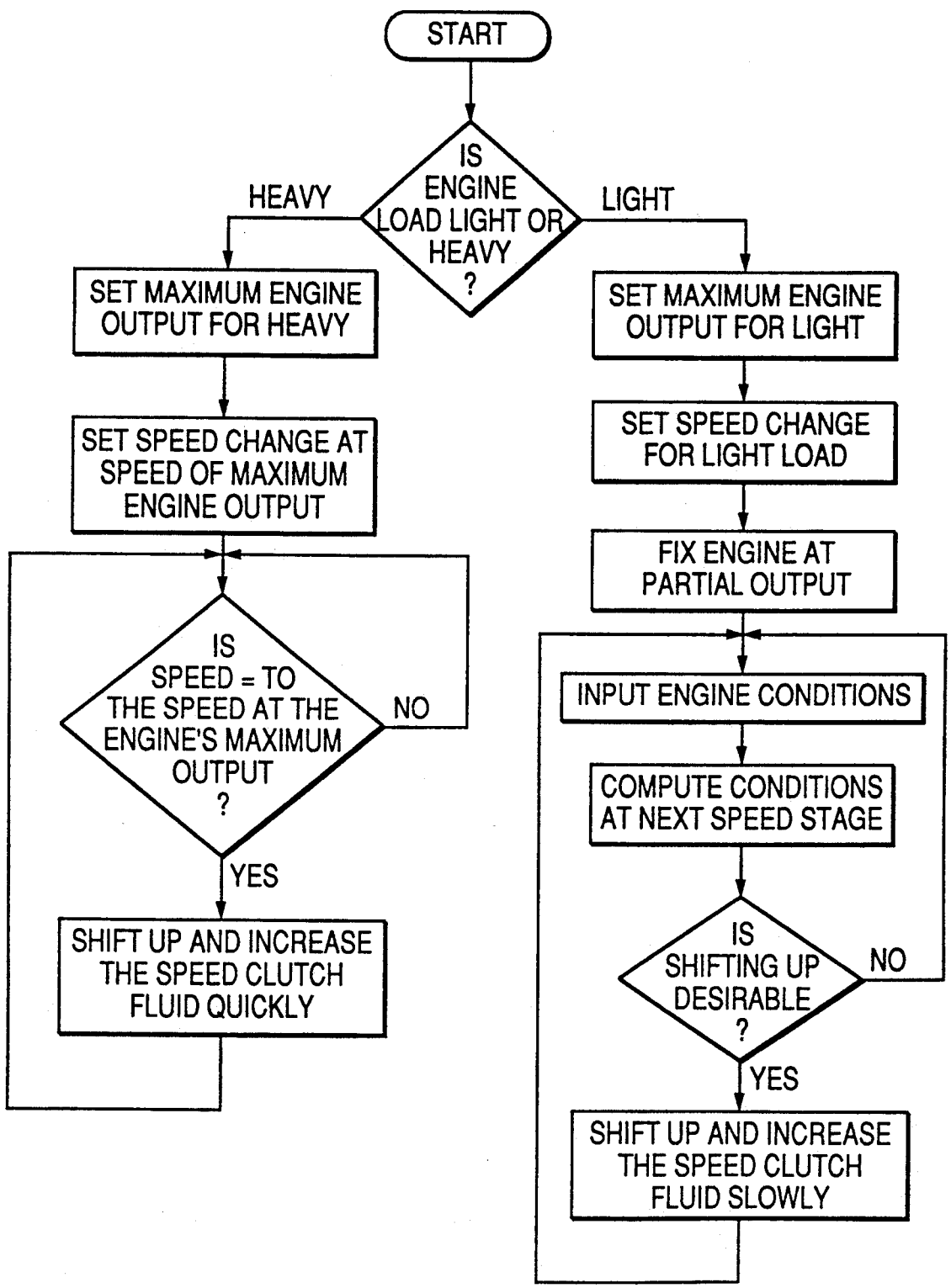
FIG. 16 is an operational flow chart of the embodiment of the automatic speed change method which is carried out in the system as shown in FIG. 6.

As is apparent from the foregoing description, when the lever 71 for the running mode changeover switch 70 is set at a light loading position E the maximum output of the engine is reduced, and also the speed change point of the transmission or speed change gear is changed over to a lower speed stage (the tractive force and the speed change point will change as shown, for example, by dotted lines in FIG. 8) so that in addition to the shift-up of the power transmission, a further improvement in the fuel cost for the engine can be achieved. FIG. 16 generally illustrates the manner in which the automatic speed change embodiment of FIG. 6 changes to a higher speed stage. The shifting operation varies depending on whether the running mode changeover switch 70 is in a heavy loading position P or a light loading position E. Following the loading determination, the operating conditions are set accordingly and a shift-up operation occurs when the respective criteria for the loading position is met.

Figure 9:
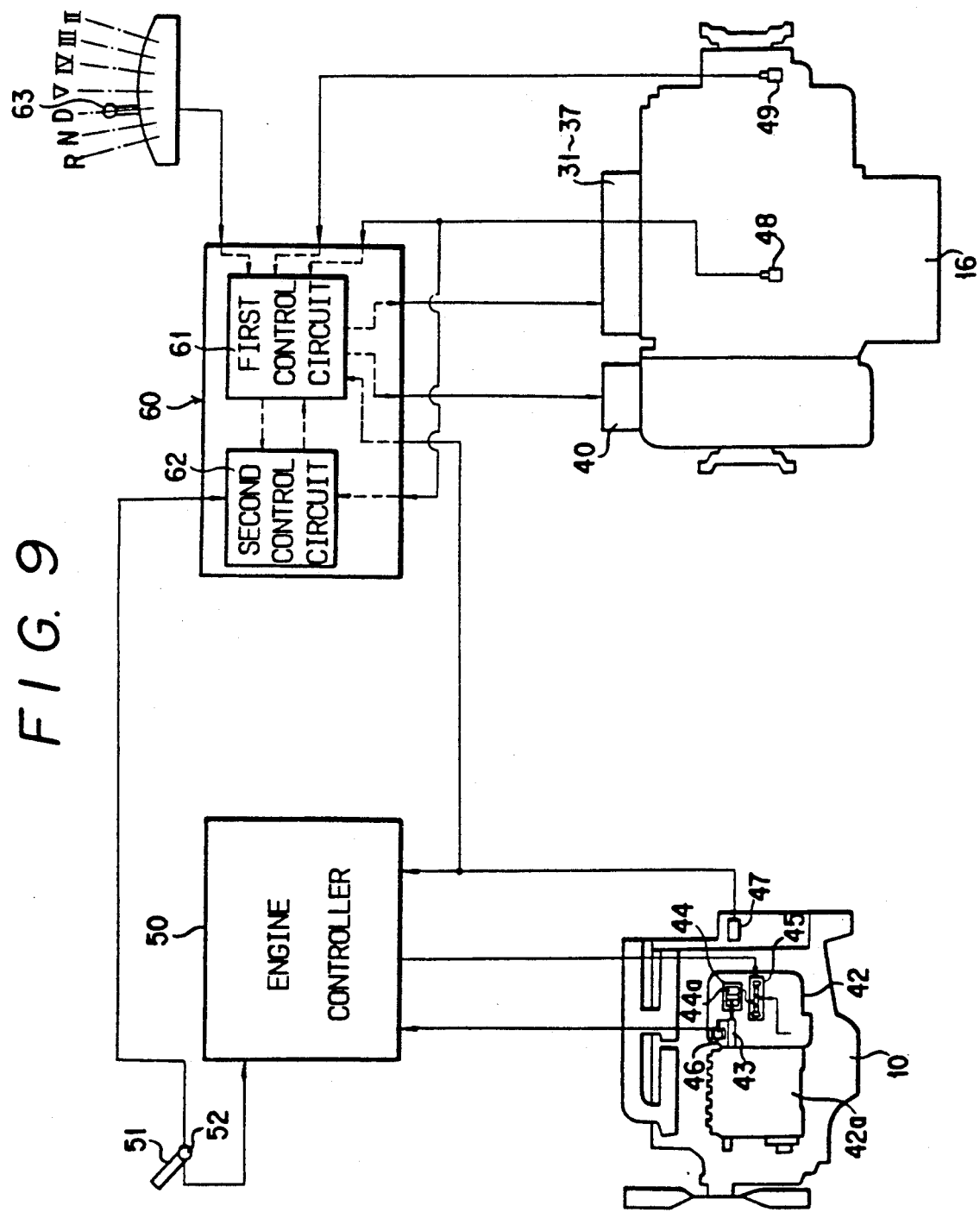
FIGS. 9 and 10 are schematic, overall explanatory views of the systems for carrying out two further embodiments of the automatic speed change method according to the present invention.

Next, the schematic configuration of a system for carrying out a third embodiment of the automatic speed change method according to the present invention is shown in FIG. 9.

Since FIG. 9 is also similar to FIG. 4, the detailed description thereof is omitted.

In FIG. 9, the above-mentioned second control circuit 62 is adapted to be input with a signal indicative of the degree of opening of the accelerator transmitted by the accelerator sensor 52, the revolving speed of the input shaft of the transmission transmitted by the input shaft revolving speed detecting sensor 48 and a signal indicative of the present speed stage transmitted by the control circuit 61 so as to compute the deceleration of the vehicle on the basis of the revolving speed of the input shaft of the transmission and transmit as an output a signal indicative of a slope running-up speed corresponding to the deceleration, which has been computed when a speed stage signal is input on the basis of the thus computed deceleration, to a first control circuit 61.

Stating more concretely, the second control circuit 62 computes the deceleration of the vehicle when it is supplied or input with any one of signals indicative of the forward seventh to fifth speeds $F_7$ to $F_5$. This computation of the deceleration of the vehicle is made when the signal indicative of the degree of opening of the accelerator in full open state lasts for 0.5 seconds. This is because if the accelerator is not fully open the degree of opening of the accelerator tends to fluctuate due to the vibration of the vehicle body thus rendering the deceleration unstable.

Further, the deceleration of the vehicle is computed by a formula "$K \times (Ni-N)/T$" wherein K is a correction coefficient, Ni the revolving speed of the input shaft of the transmission which has changed from N after the lapse of T seconds.

In case the thus computed deceleration is compared with the present value of deceleration and it is found that the former is more than the latter, it is discriminated that the vehicle has entered a slope with a high gradient, and a predetermined slope running-up speed is selected on the basis of the present speed stage and the deceleration which occurs when running up a slope. The arrangement is made such that when the actual vehicle speed becomes a value corresponding to the slope running-up speed stage a speed change signal is transmitted or output by the first control circuit 61 so that an automatic speed change to a preset lower speed stage can be made.

That is to say, the tractive force required for the vehicle in running up a slope can be computed on the basis of the speed stage when the vehicle is running on a flatland and the deceleration which occurs when the vehicle has entered a slope, and a slope ascending speed can be decided on the basis of the thus computed, required tractive force.

Thus, it is possible to predetermine the slope running-up speed on the basis of the speed reduction ratio at each of the speed stages and the output of the engine, and predetermine the slope running-up speed on the basis of such actual measurement data. An optimum slope running up speed change can be selected by the preset value, the speed stage when the vehicle is actually on the flatland, and the deceleration which occurs when the vehicle is running up on the slope.

Further, if the vehicle speed is changed over to a slope running-up speed stage which is selected when the actual slope running-up speed is higher than a value corresponding to the selected slope running-up speed, then the engine will overrun, and therefore the arrangement is made such that when the actual slope running-up speed of the vehicle has been set at a value corresponding to the selected slope running-up speed a speed change signal is transmitted by the first control circuit 61 so as to make a speed change to a preset lower speed stage.

And, when the first control circuit 61 is input with deactivating conditions, the speed change mode is returned by the first control circuit 61 to the ordinary automatic speed change mode.

The deactivating conditions referred above include that the gear shift lever 63 has been changed over, that a braking signal has been input, and that the accelerator has been put in a partially open or closed condition.

Figure 11:
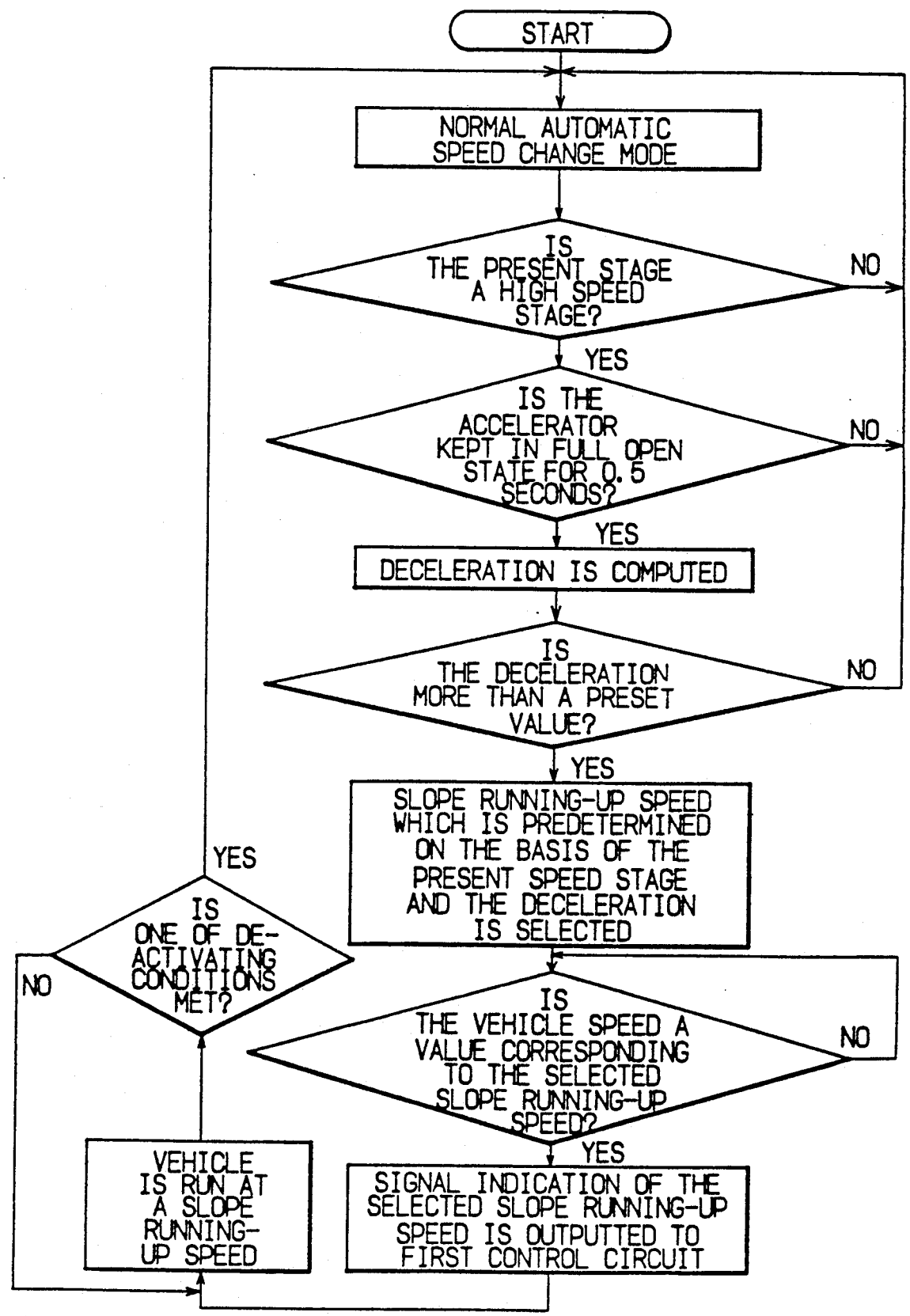
FIG. 11 is an operational flow chart of the automatic speed change method which is carried out in the system as shown in FIG. 9.

If the above operation is shown by a flow chart, the result as shown in FIG. 11 is obtained.

Further, while the deceleration of the vehicle is computed in the above-mentioned embodiment, it is also possible to detect the acceleration of the vehicle and make an automatic speed change to a slope running-up speed stage according to the thus detected acceleration.

Stating in brief, it may be made to detect the rate of change in the vehicle speed and automatically change the vehicle speed over to a slope running-up speed stage on the basis of the thus detected rate of change in the vehicle speed.

Further, the first and second control circuits 61 and 62 in the transmission controller 60 may be configured as one microcomputer in order to conduct the ordinary automatic speed change and the automatic speed change to be made in running up a slope.

Figure 10:
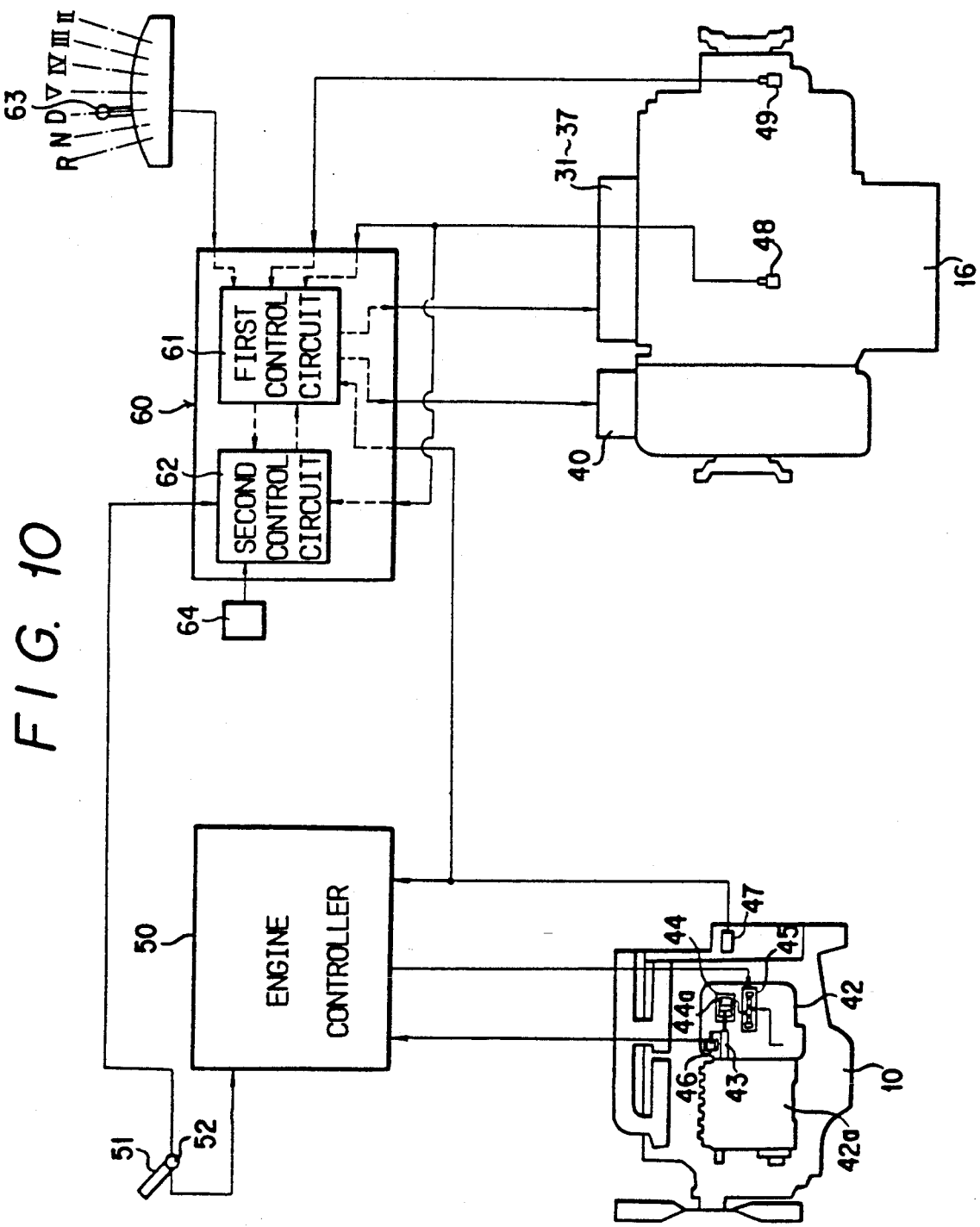

A fourth embodiment of the automatic speed change method according to the present invention will now be described below with reference to the schematic configuration of the running control system of a dump truck for use as a construction vehicle as shown in FIG. 10.

Since FIG. 10 is also similar to FIG. 4, the detailed description thereof is omitted herein.

In FIG. 10, the above-mentioned second control circuit 62 is supplied or input with a signal indicative of the degree of opening of the accelerator transmitted by the accelerator sensor 52, a signal indicative of the revolving speed of the input shaft of the transmission or speed change gear transmitted by the input shaft revolving speed detecting sensor 48, and a signal indicative of braking transmitted by a braking sensor 64 and transmits a lower speed stage signal to the first control circuit 61 when it has discriminated that the vehicle is in an idling condition.

In the next place, the operation thereof will be described in more concrete manner with reference to the flow chart shown in FIG. 12.

The arrangement is made such that when the vehicle is running in the ordinary speed change mode it is discriminated whether the vehicle speed is at a high speed stage, for example, any one of the forward seventh to fifth speeds $F_7$ to $F_5$, and if it has been discriminated that the vehicle speed is at a high speed stage, then it is discriminated whether the degree of opening of the accelerator is zero. If it has been discriminated that the degree of opening of the accelerator is zero, then it is detected whether a braking signal is input continuously for more than 10 seconds. In case the braking signal is not-input in the above-mentioned operation it is proved that the vehicle is in an idle running condition.

As a result, the ordinary automatic speed change mode is prohibited and the present high speed stage is maintained, and the present vehicle speed is computed and detected on the basis of the revolving speed of the input shaft of the speed change gear, whilst when the vehicle speed has reached a preset low speed stage which is, for example, a value corresponding to the forward second speed $F_2$, the second control circuit will transmit a signal indicative of the preset low speed stage as an output signal to the first control circuit 61. Then, the first control circuit 61 will transmit a speed change signal so that the vehicle speed may be automatically changed over to the preset low speed stage.

And, when any one of deactivating conditions or requirements are met, the vehicle speed will be returned to the ordinary automatic speed change mode.

The deactivating conditions referred to above include that the gear shift lever 63 has been switched over, that the braking signal has been input for more than 10 seconds, that the vehicle has been running idly for more than 60 seconds, and that the degree of opening of the accelerator is not zero.

Figure 12:
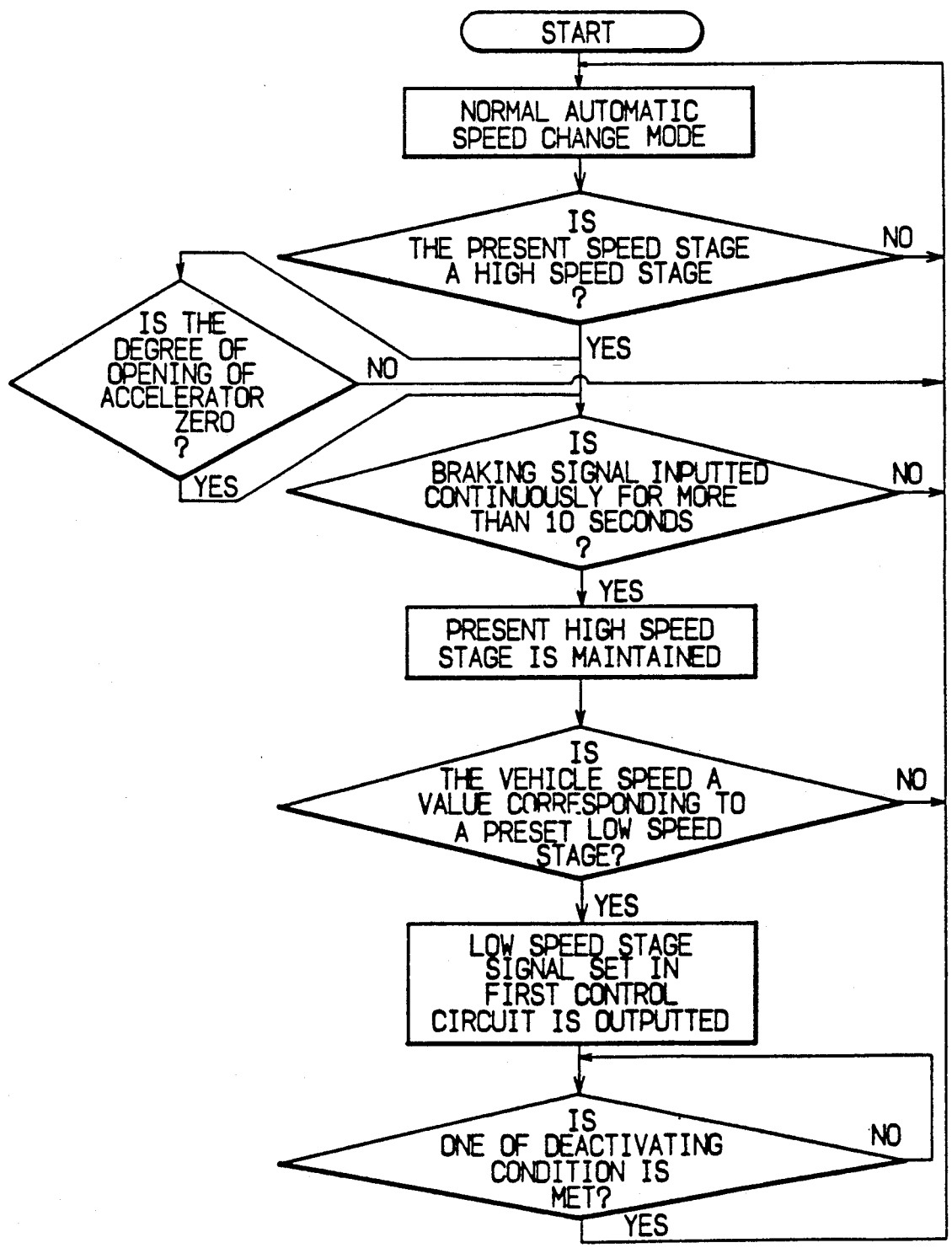
FIG. 12 is an operational flow chart of the automatic speed change method which is carried out in the system as shown in FIG. 10.

Further, the first and second control circuits 61 and 62 of the power transmission controller 60 may be integrated into one unit so as to conduct the ordinary automatic speed change and also perform the above-mentioned operation shown in FIG. 12 so that the vehicle speed may be changed straight over to a low speed stage when the vehicle is in an idle running condition.

Further, the fifth embodiment of the automatic speed change method according to the present invention will be described below with reference to the operational flow chart shown in FIG. 13.

That is to say; when the power transmission controller 60 is input with a speed change command, for example, a signal indicative of a vehicle speed which exceeds a speed change point, the power transmission controller 60 will transmit a deenergizing signal to the solenoid 40a so as to allow the lock-up changeover or control valve 40 to assume its draining position to disengage the lock-up clutch 18. When this lock-up clutch 18 has been disengaged, a solenoid deenergizing signal is transmitted to the solenoid 40a which is energized at that time to thereby allow the speed change valve associated therewith to assume its draining position, and also a solenoid energizing signal is transmitted to energize the solenoid for the speed stage to which a speed change is to be made thereby allowing the speed change valve associated therewith to assume its supply position to make the speed change. And, upon the completion of the speed change, a signal for energizing the solenoid 40a is transmitted so as to allow the lock-up changeover valve 40 to assume its supply position to connect or engage the lock-up clutch 18.

Whilst, the second control circuit 54 in the engine controller 50 is input with the number of revolutions of the engine and the position of the rack rod as well as a speed change command transmitted by the power transmission controller 60. In case the speed change command is a shift-down, after the completion of the shift-down, the first control circuit 53 of the engine controller 50 will transmit a signal indicative of a speed increase to the control valve 45 for a predetermined period of time, for example, one second immediately before the power transmission controller 60 transmits a signal for energizing the above-mentioned solenoid 40a, thereby increasing the amount of the fluid to be supplied into the chamber 44a of the hydraulic cylinder 44 to move the rack rod 43 so as to increase the amount of the fuel to be injected into the engine thus allowing the engine to be rotated at a higher speed for a predetermined time.

As a result, when the lock-up clutch 18 is connected or engaged, the number of revolutions of the engine will correspond to the number of revolutions of the input shaft of the power transmission or speed change gear so that the occurrence of any shocks due to a speed change can be avoided.

Figure 13:
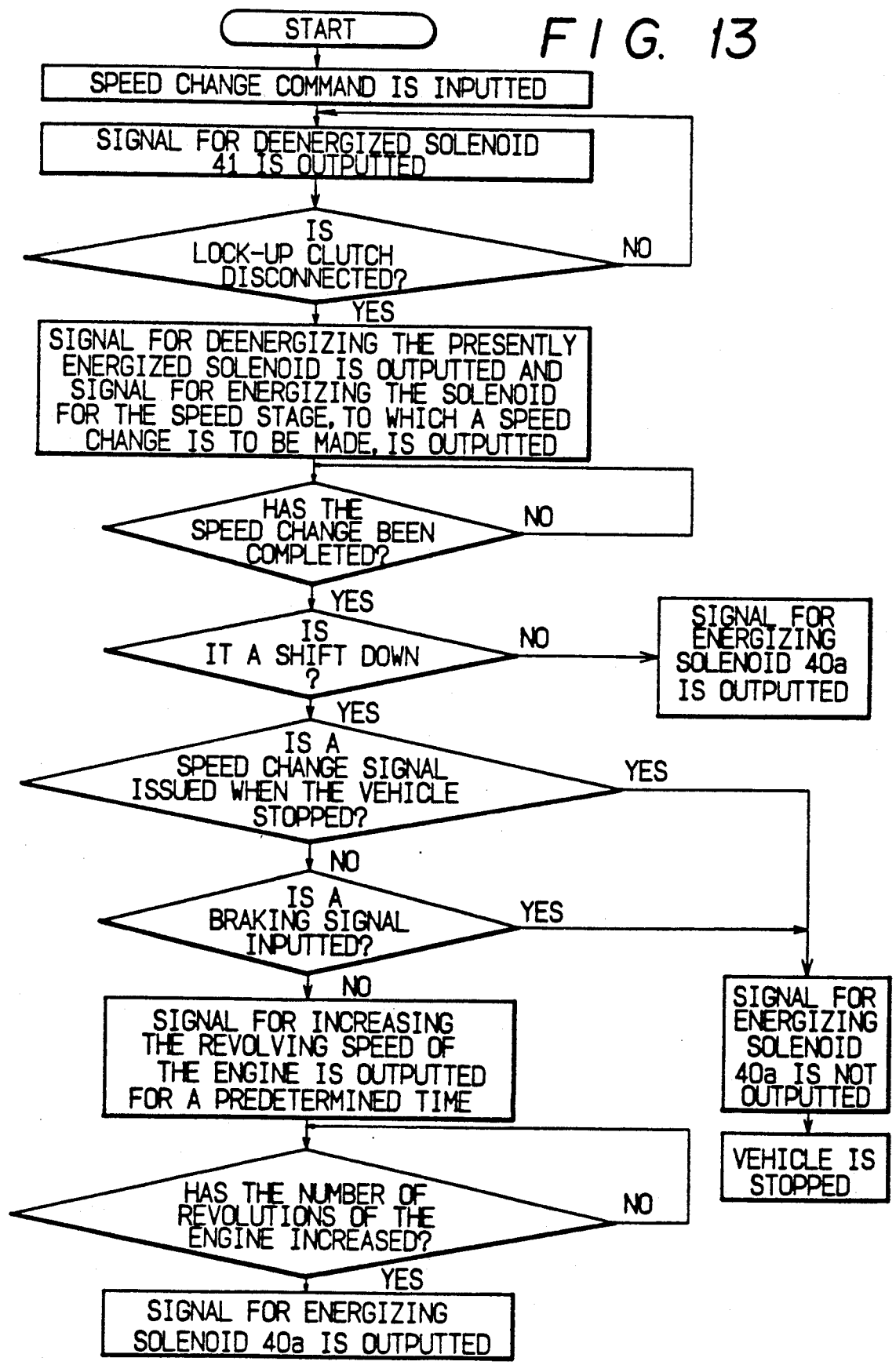
FIG. 13 is an operational flow chart of another embodiment of the automatic speed change method according to the present invention.

Further, the second control circuit 54 may be provided in the transmission controller 60 to conduct a speed change as indicated in the flow chart shown in FIG. 13.

Stating in brief, when the speed change command is not a shift-down, a signal for energizing the solenoid 40a is transmitted as an output signal so as to allow the lock-up clutch to be connected or engaged, whilst when the speed change command is a shift-down, there is no issuance of any speed stage signal when the vehicle is stopped, and when no signal indicative of braking is input, a signal for increasing the rotational speed of the engine is transmitted for a predetermined time. Further, in case any speed stage signal is issued when the vehicle is stopped and in case a signal indicative of braking is input, the vehicle may be stopped in the condition that the engine is connected through a torque converter with the power transmission or speed change gear without transmitting a signal for energizing the solenoid 40a.

Still further, the sixth embodiment of the automatic speed change method according to the present invention will be described below with reference to FIGS. 14 and 15.

Figure 14:
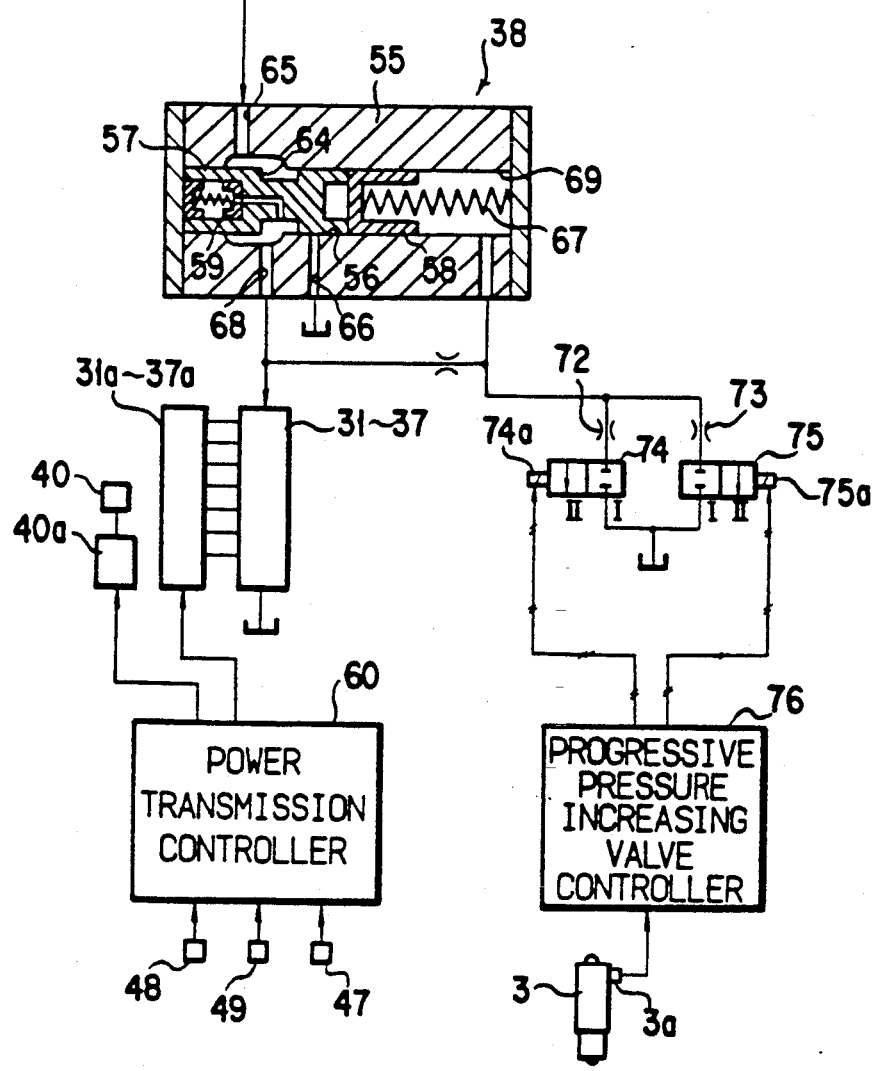
FIG. 14 is a schematic explanatory view of the construction of the system for carrying out a further embodiment of the automatic speed change method of the present invention.

FIG. 14 shows the schematic configuration of a system for carrying out the automatic speed change method of the sixth embodiment of the present invention. The component parts indicated with the same reference numerals as those used in FIG. 4 have the same functions, and therefore the detailed description thereof is omitted herein.

The method according to the sixth embodiment can be achieved by controlling the above-mentioned modulation valve (inching valve) 38.

As shown in FIG. 14, the modulation valve (inching valve) 38 is of a publicly known construction in that it comprises a pressure regulating valve 57 and a back pressure valve 58 fitted in a valve hole 56 formed in its valve body 55, the pressure regulating valve 57 containing a load piston 59 therein so as to introduce the pressure in a constricted portion 64 having a smaller diameter therein to urge the pressure regulating valve 57 to the right hand to allow communication between an inlet port 65 and a draining port 66, and the back pressure valve 58 having a spring 67 for urging the pressure regulating valve 57 through the back pressure valve 58 to the left so as to cut off the communication between the inlet valve 65 and the draining valve 66, the arrangement is made such that the fluid under pressure in an outlet port 68 is supplied into a spring chamber 69 so as to repeat the rightward movement of the pressure regulating valve 57 by the load piston 59 and the leftward movement of the pressure regulating valve 57 by the resilient force of the spring 57 and also by the action of the fluid pressure force on the side of the outlet port thereby raising the fluid pressure force in the outlet port 68 progressively. The above-mentioned spring chamber 69 is connected to the drain through a first restriction 72, a second restriction 73, a first solenoid valve 74 and a second solenoid valve 75. The first and second solenoid valves 74 and 75 are normally held at their cut-off positions I, but are arranged to be changed over to their communicating positions II when the first and second solenoids 74a and 75a associated therewith, respectively, are energized.

Reference numeral 76 denotes a controller for the progressive pressure increasing valve adapted to discriminate whether the vehicle is in unloaded or loaded condition on the basis of the suspension pressure transmitted by a suspension pressure sensor 3a provided in the aforementioned suspension cylinder 3 and transmit a signal for energizing the first solenoid 74a when the vehicle is in an unloaded condition and transmit a signal for energizing the second solenoid 75a when the vehicle is in a loaded condition so that when the vehicle is in an unloaded condition part of the fluid under pressure in the outlet port 68 is allowed to flow through the first restriction 72 and then through the first solenoid valve 74 into the drain to thereby reduce the fluid pressure force on the side of the outlet port to be supplied into the spring chamber 69, whilst when the vehicle is in a loaded condition part of the fluid under pressure in the outlet port 68 is allowed to flow through the second restriction 73 and then through the second solenoid valve 75' into the drain thereby reducing the fluid pressure force on the side of outlet port.

At that time, the flow resistance through the first restriction 72 becomes higher than that through the second restriction 73, and the fluid pressure force on the side of the outlet port which is supplied into the spring chamber 69 is remarkably reduced when the vehicle is in an unloaded condition, but it is not reduced significantly when the vehicle is in a loaded condition.

Whilst, if and when the fluid pressure on the side of the outlet port to be supplied into the spring chamber 69 is low, the leftward moving speed of the back pressure valve 58 becomes slow so that the fluid pressure in the outlet port 68 in increased slowly. Therefore, the progressive pressure increasing characteristics provided by the progressive pressure increasing valve 38 when the vehicle is in an unloaded condition become as shown by "G" in FIG. 15, whilst the same characteristics obtained by the valve 38 when the vehicle is in a loaded condition becomes as shown by "H" which is significantly different from that obtained in the unloaded condition.

Figure 15:
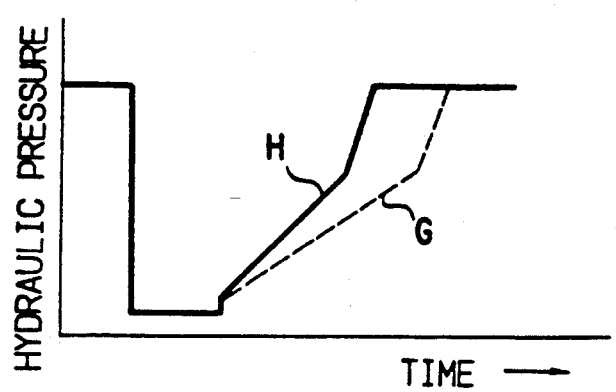
FIG. 15 is a diagram showing the pressure characteristics obtained by a progressive pressure increasing value used in the system as shown in FIG. 14.

Thus, at the time of effecting a speed change, it is discriminated whether the vehicle is in unloaded or loaded condition, and then the progressive pressure increasing characteristics provided by the progressive pressure increasing valve 38 will become as shown by either "G" or "H" in FIG. 15 to conduct a speed change operation. Therefore, when the vehicle is in an unloaded condition; that is, it is in a light load condition that the transmission torque is low, the time required for increasing the fluid pressure to a predetermined value will increase so that a speed change can be made without causing any shocks due to a speed change even if the torque transmitted by the power transmission 16 is small, whilst when the vehicle is in a loaded condition; that is, it is in a heavy load condition that the power transmission torque is high, the time required for increasing the fluid pressure to a predetermined value is reduced so that even if the torque transmitted by the power transmission 16 is high the time required until a condition is reached wherein the clutch plates are forced to engage completely with each other to ensure power transmission can be reduced whereby rendering it possible to make a speed change in a short time.

The foregoing description is merely illustrative of preferred embodiments of the present invention, and the scope of the present invention is not to be limited thereto. Many other changes and modifications of the present invention will readily occur to those skilled in the art without departing from the scope of the present invention.

What is claimed is:

1. A method for automatically changing the speed of a construction vehicle wherein an output side of an engine is connected to a torque converter provided with a lock-up clutch, wherein an output side of said torque converter is connected to an input side of a power transmission having a plurality of hydraulically actuated clutches, and wherein an output side of the power transmission is connected through a differential gear mechanism to left and right hand drive wheels, comprising the steps of:

when the vehicle is running in a heavy load condition, determining automatic speed change timing by setting a speed change point at each speed stage at an engine speed at which a maximum engine output is developed, and when the vehicle is running in a light load condition, placing the engine in a partial output developing condition to allow said vehicle to run at a selected constant vehicle speed;

inputting the amount of fuel injected into the engine and the current engine speed when the vehicle is running at the selected constant vehicle speed, to said controller so as to compute a currently developed engine output and an engine speed which corresponds to a point of intersection of an equihorsepower curve for the currently developed engine output and an engine characteristic curve corresponding to that developed by the engine at its maximum output condition; and comparing the product of the computed engine speed and the speed reduction ratio at a corresponding next higher speed stage with the product of the current engine speed and speed reduction ratio at a current speed stage and if the former product is larger than the latter product, outputting a shift-up signal to said controller so that a speed stage is selected which is higher than that which would be selected by said automatic speed change in the event the vehicle was running in a heavy load condition.

2. The method as claimed in claim 1, further comprising the step of transmitting a fuel injection control signal simultaneously with said step of automatically selecting a higher speed change to enable the production of a horsepower in said higher speed stage which is equal to the horsepower being produced in said current speed stage when the input is made.

3. A method for automatically changing the speed of a construction vehicle wherein an output side of an engine is connected to a torque converter provided with a lock-up clutch, wherein an output side of said torque converter is connected to an input side of a power transmission having a plurality of hydraulically actuated clutches, and wherein an output side of the power transmission is connected through a differential gear mechanism to left and right hand drive wheels, comprising the steps of:

controlling the fuel injection amount by selectively operating a running mode changeover switch which is operatively connected with both said engine and said transmission of the vehicle, between a first position wherein the engine is enabled to produce a first maximum power output and a second position wherein the engine is enabled to produce a second limited power output amount which is less than said maximum output, and when the vehicle is running in a heavy load condition, setting said running mode changeover switch to said first position to enable said maximum power output and setting the speed change point at each speed stage at a speed corresponding to the maximum engine power output and when the vehicle is running in a light load condition, setting said running mode changeover switch to said second position wherein said second limited power output amount is enabled and setting the speed change point at each speed stage at a speed which is lower than the speed change point selected when the vehicle is running in a heavy load condition.

4. A method for automatically changing the speed of a construction vehicle wherein an output side of an engine is connected to a torque converter provided with a lock-up clutch, wherein an output side of said torque converter is connected to an input side of a power transmission having a plurality of hydraulically actuated clutches, and wherein an output side of the power transmission is connected through a differential gear mechanism to left and right drive wheels, comprising the steps of:

inputting a signal indicative of the position of an accelerator which determines the amount of fuel which is supplied to the engine to said controller, inputting a signal indicative of the rotational speed of the power transmission input shaft to said controller, and inputting a signal indicative of the speed stage which the power transmission is currently conditioned to produce, to said controller, comprising a previous rotational speed of the power transmission input shaft with the present input shaft rotation speed, and computing a vehicle deceleration value, and pre-selecting a speed stage to which the power transmission should be shifted based on the computed deceleration value, and, transmitting a signal indicative of the pre-selected speed stage, as an output signal to said controller when the computed vehicle deceleration reaches a predetermined deceleration value so that a speed changeover is made directly to said preselected speed stage which is optimal for the reduced vehicle speed, said speed changeover being made irrespective of whether the shift is made to the next consecutive speed stage or not.

5. The method as claimed in claim 4, further comprising the steps of:

making the computation of said deceleration when said accelerator is maintained in a full open condition wherein the supply of fuel to the engine is maximized for more than a predetermined time.

6. The method as claimed in claim 4, further comprising the steps of:

prohibiting the computation of said deceleration when one of (a) the opening of said accelerator is zero wherein the amount of fuel which is supplied to the engine is minimized and (b) a braking signal is input for more than a predetermined time.

7. A method for automatically changing the speed of a construction vehicle wherein the output side of the engine is connected to a torque converter provided with a lock-up clutch, wherein the output side of said torque converter is connected to the input side of a power transmission having a plurality of hydraulically actuated speed stage clutches, wherein the output side of the power transmission is connected through a differential gear mechanism to left and right drive wheels, and wherein a manually operable mode control switch is operatively connected with both said engine and said transmission, comprising the steps of, when the vehicle is running in a heavy load condition, setting said manually operable switch to a setting wherein the engine is enabled to produced maximum engine power and conditioning said transmission to rapidly increase the fluid pressure in a selected speed stage clutch to a predetermined value so that the selected speed stage clutch can be connected quickly, and when the vehicle is running in a light load condition, setting said manually operable switch to a setting wherein the engine is enabled to produce an amount of engine power which is less than the maximum engine power, and condition said transmission to increase the fluid pressure in a selected speed stage clutch to a predetermined value comparatively slowly so that the selected speed stage clutch may be connected comparatively slowly without causing any shocks due to a speed change.

8. A method for automatically changing the speed of a construction vehicle wherein an output side of an engine is connected to a torque converter provided with a lock-up clutch, an output side of said torque converter being connected to an input side of a power transmission having a plurality of hydraulically actuated speed stage clutches, wherein an output side of the power transmission is connected through a differential gear mechanism to left and right drive wheels, comprising the steps of:

when the vehicle is running a heavy load condition, setting the speed change point at each speed stage at a speed corresponding to the maximum output of the engine, and when the vehicle is running in a light load condition, limiting the engine output to a level lower than said maximum output to allow said dump truck to run at a fixed, constant speed;

inputting the position of a means for controlling the amount of fuel injected into the engine and the engine speed when the vehicle is running at the constant speed to said controller so as to compute the instantly developed engine torque and horsepower and then computing a number of engine revolutions and torque which corresponds to a point of intersection of an equihorsepower curve and an engine characteristic curve corresponding to that of the engine at its maximum output condition; and comparing the product of the computed engine torque at maximum engine output and the speed reduction ratio at a next higher speed stage, with the product of the computed engine torque at current engine output and the speed reduction ratio at a current speed stage when the input is made, making an allowance for torque, and if the former product is larger than the latter product, outputting a shift-up signal to said controller so that a speed stage is selected which is higher than that which would be selected by said automatic speed change in the event that the vehicle was running in a heavy load condition.

* * * * *